US006591964B1

United States Patent
Lanfranchi

(10) Patent No.: US 6,591,964 B1
(45) Date of Patent: Jul. 15, 2003

(54) MACHINE FOR ORIENTING CONTAINERS

(76) Inventor: Lino Lanfranchi, Via Caduti del Lavoro, 35, I-43044 Collecchio Parma (IT)

(*) Notice: Subject to any disclaimer, the term of this patent is extended or adjusted under 35 U.S.C. 154(b) by 0 days.

(21) Appl. No.: 10/031,665

(22) PCT Filed: Jul. 14, 2000

(86) PCT No.: PCT/IT00/00294

§ 371 (c)(1),
(2), (4) Date: Jan. 18, 2002

(87) PCT Pub. No.: WO01/16002

PCT Pub. Date: Mar. 8, 2001

(51) Int. Cl.[7] .............................................. B65G 47/24
(52) U.S. Cl. ........................ 198/399; 198/404; 198/382
(58) Field of Search ......................... 198/377.02, 382, 198/399, 404

(56) References Cited

U.S. PATENT DOCUMENTS

| 3,338,373 | A | * | 8/1967 | Aidlin et al. | 198/397.05 |
|---|---|---|---|---|---|
| 3,543,909 | A | * | 12/1970 | Kazou | 198/392 |
| 3,662,872 | A | * | 5/1972 | Nalbach | 198/397.05 |
| 4,130,194 | A | * | 12/1978 | Schindel et al. | 198/397.02 |
| 4,798,277 | A | * | 1/1989 | Dubuit et al. | 198/397.05 |
| 4,825,995 | A | * | 5/1989 | Nalbach | 198/380 |
| 4,979,607 | A | * | 12/1990 | Fogg | 198/392 |
| 5,065,852 | A | * | 11/1991 | Marti | 198/392 |

FOREIGN PATENT DOCUMENTS

| EP | 374 107 | * | 6/1990 |
|---|---|---|---|
| EP | 540 477 | * | 5/1993 |
| GB | 2030124 | * | 4/1980 |

* cited by examiner

Primary Examiner—Christopher P. Ellis
Assistant Examiner—Richard Ridley
(74) Attorney, Agent, or Firm—Shlesinger, Fitzsimmons & Shlesinger

(57) ABSTRACT

Machine for orienting containers of the type comprising a cylindrical structure (1), a support ring (3) integral with said cylindrical structure (1) and provided with at least an interruption (3a) for offloading the containers themselves, a rotating cylinder (4) and a fixed conical structure (5), internal and coaxial to said cylindrical structure (1). The machine further comprises a plurality of elevators (6) and a plurality of arms (9) having an extremity (9b) operatively connected to a fixed cam (11) positioned inferiorly to said conical structure (5) to command the raising and lowering of the arms themselves, wherein said fixed cam (11) comprises, for each interruption (3a) of said support ring (3), at least two portions (11a) defining the upwards run of an elevator (6), said portions (11a) being positioned upstream of said interruption (3a) according to the direction of rotation of the rotating cylinder (4).

3 Claims, 3 Drawing Sheets

MACHINE FOR ORIENTING CONTAINERS

TECHNICAL FIELD AND BACKGROUND

The present invention relates to a machine for orienting containers made of plastic material.

In particular, the machines in question pertain to the sector of automatic filling or bottling plants and perform the function of receiving the containers or bottles positioned at random and orient them arranging them in rows on a conveyor with their opening facing upwards. Different types of orienting machines are known, and in particular the present invention refers to an orienting machine as described in patent No. IT 1253395 in the name of the same Applicant.

This machine has a fixed cylindrical structure with vertical axis which encloses in order a rotating cylinder and a fixed conical structure, both coaxial relative to said cylindrical structure.

In the annulus between the rotating cylinder and the maximum radial extension of the conical structure, some elevators are inserted, mounted on the inner wall of the rotating cylinder and integral therewith in rotation about the vertical axis.

Such elevators are engaged in guides integral with the rotating cylinder so as to be able to translate vertically relative thereto. The elevators receive the containers positioned horizontally and transfer them from the lower edge of the conical structure to the upper edge of the cylinder, where they are offloaded inside receptacles integral with the outer wall of the rotating cylinder.

Below the receptacles is provided a fixed ring, integral with the cylindrical structure, provided with one or more interruptions which constitute the offloading point of the containers themselves. When the container arrives in proximity to one of such interruptions, its support is removed, so the container drops internally to drop channels positioned underneath the receptacles.

The shape of the receptacle allows in this phase to upset the container whilst maintaining its opening upwards.

The alternating vertical translation motion is imparted to the elevators by means of radial arms positioned inferiorly to the fixed conical structure, rotating about the axis of rotation of the cylinder and operatively connected to a fixed cam. Such cam is shaped in such a way as to raise and lower the arms and consequently the elevators in positions determined by the trajectory of rotation of the rotating cylinder, and in particular to raise them upstream of each interruption of the fixed ring, according to the direction of rotation of the cylinder.

If during the loading of the containers on the elevators and their positioning into the receptacles, the containers are not arranged correctly, suitable means, such as blowing nozzles, throw the containers back onto the conical structure.

Consequently, the corresponding receptacles remain empty and they will be loaded during the subsequent turn, in the case of machines that offload once, or in the second segment of the fixed ring, in the case of machines that offload twice.

This entails that during the loading phase in question, the maximum productivity allowed by the machine and corresponding to the number of receptacles which can be filled, is not reached.

DISCLOSURE OF INVENTION

The aim of the present invention is to eliminate the aforesaid drawbacks making available a machine for orienting containers which allows to increase the degree of filling of the receptacle for each loading phase, avoiding leaving receptacles empty due to erroneous positions of the containers.

Said aims are fully achieved by the machine for orienting containers of the present invention, which is characterised by the contents of the claims set out below and in particular in that the fixed cam commanding the elevators comprises, for each interruption for offloading the containers of the support ring, at least two portions defining the upwards run of an elevator, said portions being positioned upstream of said interruption according to the direction of rotation of the rotating cylinder.

Briefly, the cam is shaped so that before the offloading position the elevator performs two or more upwards runs.

BEST MODE FOR CARRYING OUT THE INVENTION

This and other features shall become more readily apparent from the general description of a preferred embodiment illustrated, purely by way of non limiting example, in the accompanying drawing tables, wherein.

Figure 1:
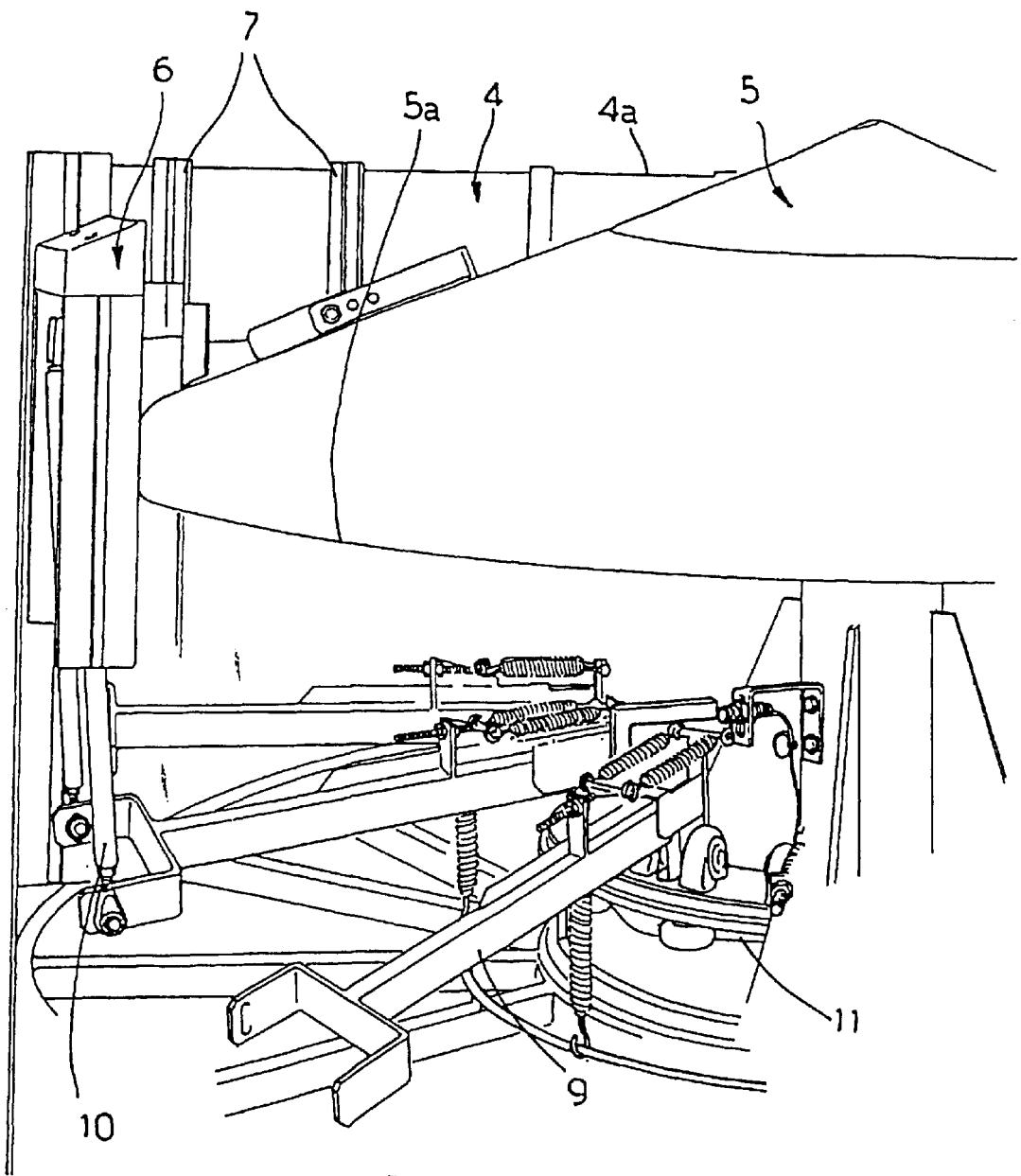
FIG. 1 shows a partial perspective view of a machine for orienting containers.
Figure 2:
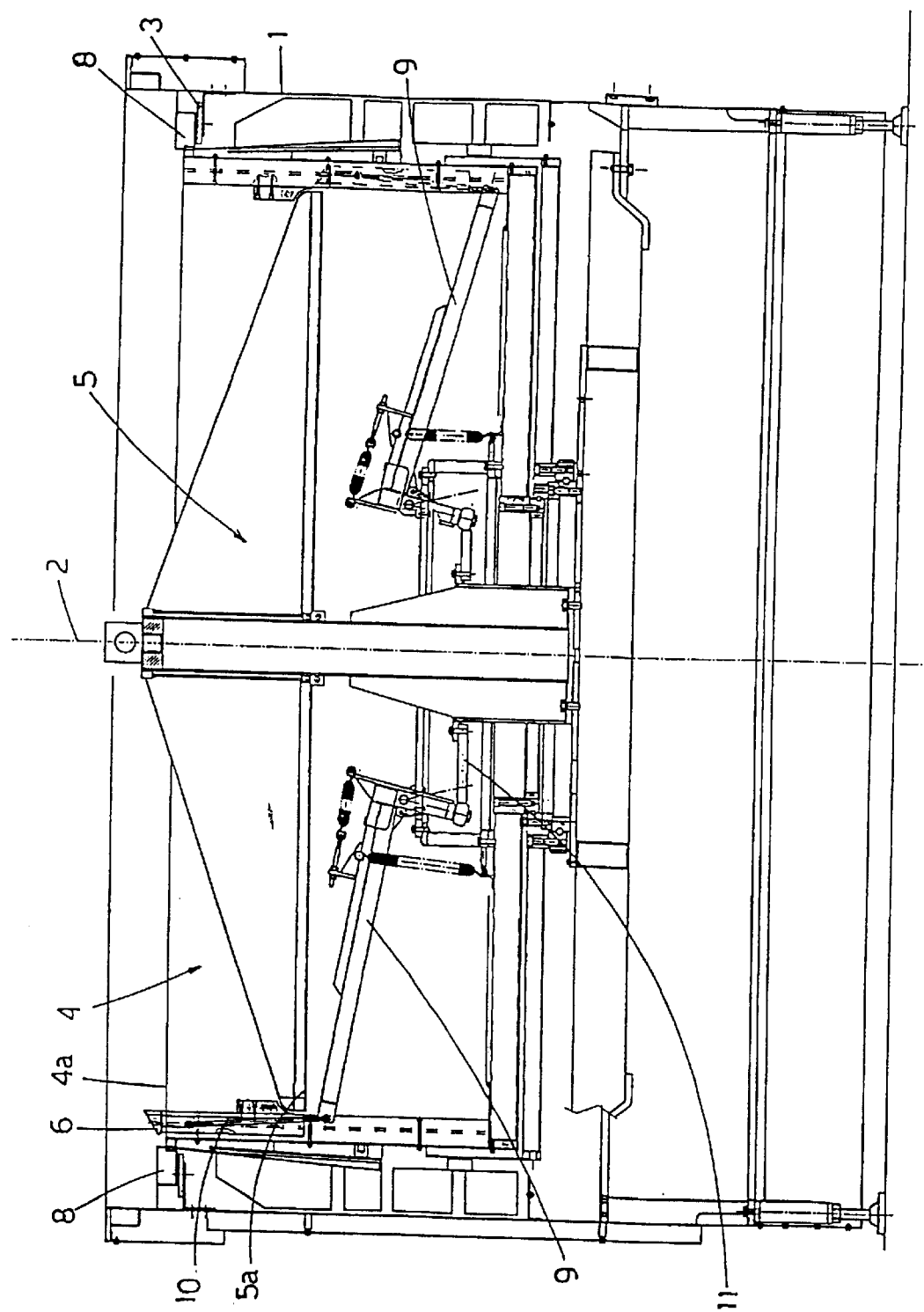
FIG. 2 is a sectioned front view of a portion of the orienting machine of FIG. 1.

With reference to FIGS. 1 and 2, the reference number 1 indicates a fixed cylindrical structure with vertical axis 2. The cylindrical structure 1 serves as an external structure for protecting the moving elements of the machine and further comprises a support ring 3 of the containers positioned horizontally.

Figure 3:
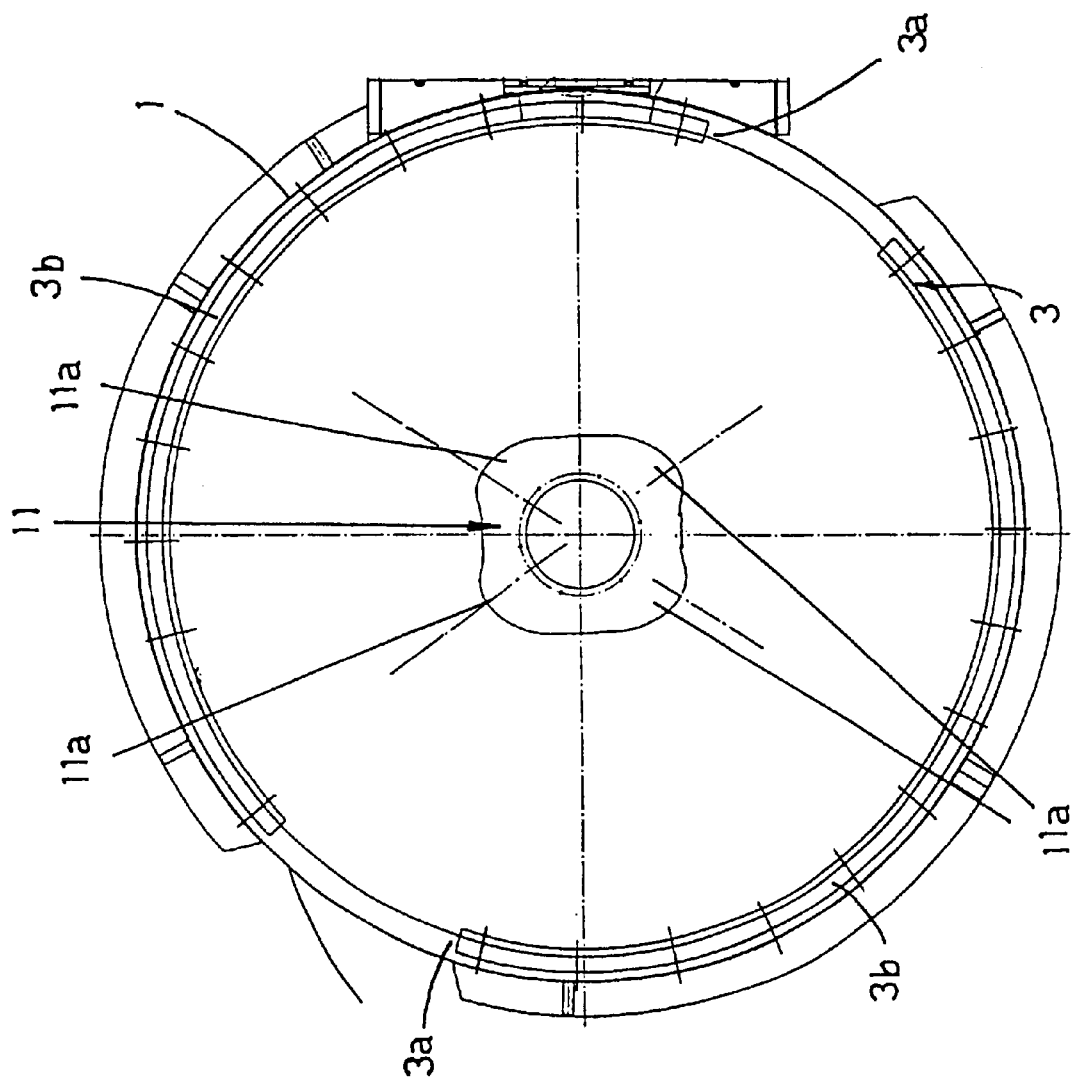
FIG. 3 shows a top view of the machine of FIG. 1 and 2, partially shown.

This support ring 3 is provided with at least an interruption 3a for offloading the containers. In particular, a single interruption can be provided, in the case of machines with a single offloading of the containers, or, as shown in FIG. 3, two interruptions 3a can be provided, corresponding to a machine with two container offloading positions. In this latter case the supporting ring 3 presents two segments 3b alternated by the interruptions 3a.

Internally to the cylindrical structure 1 is present a cylinder 4 and a conical structure 5. Both the cylinder 4 and the conical structure 5 are coaxial with the cylindrical structure 1.

The cylinder 4 rotates about said vertical axis 2, whilst the conical structure 5 is fixed and favours the rolling of the containers towards the inner lateral wall of the cylinder 4. Between the cylinder 4 and the conical structure 5 are present elevators 6 engaged in guides 7 integral with the inner lateral wall of the rotating cylinder 4.

The elevators 6 are constituted by a box element having an upper surface 6a inclined in such a way as to provide a housing for the containers, said housing being delimited by the wall 6a of the elevator, by the walls of the guides 7 and by the inner lateral wall of the cylinder 4.

The elevators 6 are translatable between a lower edge 5a of the conical structure 5 and an upper edge 4a of the cylinder 4 to transfer the container into receptacles 8 integral with the outer lateral wall of the cylinder 4. The bottom of the receptacles 8 is obtained by means of the support ring 3.

The alternating vertical motion of the elevators is commanded by a plurality of arms 9 positioned as spokes of a wheel and rotating about the vertical axis 2. The arms have an extremity 9a acting on the elevators 6 by means of a connecting rod 10, whilst the other extremity 9b is operatively associated to a fixed cam 11 positioned inferiorly to the conical structure 5 to command the raising and lowering of the arms themselves.

The fixed cam 11 originally comprises, for each interruption 3a of the support ring 3, at least two portions 11a defining the upwards run of an elevator 6. The portions are positioned upstream of the interruption 3a corresponding, according to the direction of rotation of the rotating cylinder 4.

In particular, according to the embodiment shown in FIG. 3, the support ring 3 comprises two interruptions 3a for offloading the containers, defining the segments 3b of the support ring itself. Consequently the fixed cam 11 comprises two portions 11a defining the upwards run of an elevator 6 for each segment 3b of the support ring 3b. According to an embodiment variation not shown in the figures, the support ring 3 comprises an interruption 3 for offloading the containers and the fixed cam 11 comprises two portions 11a defining the upwards run of an elevator 6 positioned upstream of the interruption 3a according to the direction of rotation of the rotating cylinder 4.

The original shape of the fixed cam 11 allows to perform two translations of the elevators 6 before each interruption 3a of the support ring 3.

Consequently if the container raised during the first upwards run needs to be thrown back onto the conical structure 5 because it is not correctly positioned on the elevator itself or in the receptacle, the productivity of the machine can still be maintained high, a second upwards run of the elevators being available before reaching the offloading area corresponding to the interruption 3a of the support ring.

According to a possible variation not illustrated herein, for each offloading section also more than two elevations or upward runs of the elevators may be provided and consequently the cam shall have multiple elevation points 11a.

What is claimed is:

1. Machine for orienting containers of the type comprising:

a fixed cylindrical structure (1) with vertical axis (2);

a ring (3) for supporting the containers positioned horizontally, integral with said cylindrical structure (1) and provided with at least an interruption (3a) for offloading the containers themselves;

a rotating cylinder (4) internal and coaxial to said fixed cylindrical structure (1);

a fixed conical structure (5) positioned internal and coaxial relative to said cylinder (4) to favour the rolling of the containers towards the inner lateral wall of said rotating cylinder (4);

a plurality of elevators (6) engaged in guides (7) integral with said inner lateral wall of the rotating cylinder (4) and providing housings translatable between a lower edge (5a) of said conical structure (5) and an upper edge (4a) of said cylinder (4) for transferring said containers;

a plurality of arms (9) arranged as spokes of a wheel and rotating about said vertical axis (2), said arms (9) having an extremity (9a) acting on said elevators (6);

a fixed cam (11) positioned inferiorly to said conical structure (5) operatively engaged with the other extremity (9b) of said arms (9) to command the raising and the lowering of the arms themselves, characterised in that said fixed cam (11) comprises, for each interruption (3a) for offloading the containers of said support ring (3), at least two portions (11a) defining the upwards run of an elevator (6), said portions (11a) being positioned upstream of said interruption (3a) according to the direction of rotation of said rotating cylinder (4).

2. An orienting machine as claimed in claim 1, characterised in that said supporting ring (3) comprises an interruption (3a) for offloading the containers and in that said fixed cam (11) comprises two portions (11a) defining the upwards run of an elevator (6) positioned upstream of said interruption (3a) according to the direction of rotation of said rotating cylinder (4).

3. An orienting machine as claimed in claim 1, characterised in that said support ring (3) comprises two interruptions (3a) for offloading the containers, defining two segments (3b) of said support ring (3), and in that said fixed cam (11) comprises two or more portions (11a) defining the upwards run of an elevator (6) for each segment (3b) of said support ring (3).

* * * * *